(12) United States Patent
Meadowcroft et al.

(10) Patent No.: US 8,041,160 B2
(45) Date of Patent: Oct. 18, 2011

(54) OPTICAL COMMUNICATIONS DEVICE HAVING A MOUNTING CORE AND METHOD

(75) Inventors: David J. K. Meadowcroft, San Jose, CA (US); An-Nien Cheng, San Jose, CA (US); Ronald T. Kaneshiro, Los Altos, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 72 days.

(21) Appl. No.: 12/424,273

(22) Filed: Apr. 15, 2009

(65) Prior Publication Data

US 2010/0266236 A1    Oct. 21, 2010

(51) Int. Cl.
G02B 6/12        (2006.01)
(52) U.S. Cl. ............................................. 385/14; 29/825
(58) Field of Classification Search .................... 385/14
See application file for complete search history.

(56) References Cited

U.S. PATENT DOCUMENTS

| | | | |
|---|---|---|---|
| 6,351,027 B1 | 2/2002 | Giboney et al. | |
| 6,775,149 B1 | 8/2004 | Uchiyama | |
| 7,331,720 B1 * | 2/2008 | McColloch | 385/88 |
| 2004/0072456 A1 | 4/2004 | Dozier et al. | |
| 2007/0119541 A1 | 5/2007 | Kawabata et al. | |
| 2007/0293088 A1 | 12/2007 | Hiew et al. | |

* cited by examiner

*Primary Examiner* — Sarah Hahm

(57) ABSTRACT

A parallel optical communications device is provided that has a mounting core that functions as a mounting system for mounting core components of the parallel optical communications device. In addition, the mounting core functions as a heat dissipation system for the core components of the parallel optical communications device, and also protects the core components and other elements of the communications device from dust and damage that can be caused by handling and other factors. In addition to performing the aforementioned functions, the mounting core is configured to enable the parallel optical communications device to be made extremely small in size while also protecting signal integrity.

20 Claims, 5 Drawing Sheets

OPTICAL COMMUNICATIONS DEVICE HAVING A MOUNTING CORE AND METHOD

TECHNICAL FIELD OF THE INVENTION

The invention relates to optical communications devices. More particularly, the invention relates to optical communications devices such as parallel optical transmitters, receivers and transceivers for simultaneously transmitting and/or receiving multiple optical signals over multiple optical channels.

BACKGROUND OF THE INVENTION

A variety of parallel optical communications devices exist for simultaneously transmitting and/or receiving multiple optical data signals over multiple respective optical data channels. Parallel optical transmitters have multiple optical transmit channels for transmitting multiple respective optical data signals simultaneously over multiple respective optical waveguides (e.g., optical fibers). Parallel optical receivers have multiple optical receive channels for receiving multiple respective optical data signals simultaneously over multiple respective optical waveguides (e.g., optical fibers). Parallel optical transceivers have multiple optical transmit channels and multiple optical receive channels for transmitting and receiving multiple respective optical transmit and receive data signals simultaneously over multiple respective transmit and receive optical waveguides (e.g., optical fibers).

For each of these different types of parallel optical communications devices, a variety of different designs and configurations exist. A typical layout for a parallel optical communications device includes a flex circuit on which a plurality of active optical devices (e.g., laser diodes and/or photodiodes) are mounted and a circuit board, such as a printed circuit board (PCB), a ball grid array (BGA), or the like, that is electrically connected to the flex circuit. In the case of a parallel optical transmitter, in addition to the laser diodes that are mounted to the flex circuit, a laser diode driver integrated circuit (IC) is typically also mounted on the flex circuit. The flex circuit has electrical conductors running through it that are electrically connected to electrical contact pads of the laser diodes and of the laser diode driver IC. The circuit board to which the flex circuit is electrically connected also has electrical conductors running through it (i.e., electrical traces and vias) and electrical contact pads on it. Through the electrical connections between the flex circuit and the circuit board, the electrical contact pads of the laser diode driver IC are electrically connected to the electrical conductors of the circuit board. One or more electrical components, such as a controller IC and other electrical components, are typically mounted on and electrically connected to the circuit board, thereby providing electrical connections between one or more of these electrical components and the laser diode driver IC mounted on the flex circuit. The flex circuit of the typical parallel optical transmitter often has additional components mounted thereon, such as, for example, monitor photodiodes and associated circuitry for monitoring and adjusting the output power levels of the laser diodes.

Similar configurations are used for parallel optical receivers, except that the flex circuit of a parallel optical receiver has a plurality of photodiodes instead of laser diodes and a receiver IC instead of a laser diode driver IC mounted on it. Parallel optical transceivers typically have laser diodes, photodiodes, a laser driver diode IC, and a receiver IC mounted on the flex circuit, although one or more of these devices may be integrated into the same IC to reduce part count and to provide other benefits.

In the aforementioned parallel optical communications devices, the circuit board (e.g., a BGA) of the device typically has a heat sink device mounted on the upper surface thereof. The controller IC is typically attached by a thermally conductive material to this heat sink device to enable heat generated by the controller IC to pass into and be dissipated by the heat sink device. The portion of the flex circuit on which the laser diode driver IC or receiver IC are mounted typically is in contact with one or more other heat sink devices that dissipate heat produced by these ICs.

The aforementioned heat sink devices have various shapes or configurations, but have the same general purpose of receiving heat generated by the ICs and absorbing and/or spreading out the heat such that the heat is moved away from the ICs. Heat generated by the ICs can detrimentally affect the performance of the parallel optical communications device. For example, in parallel optical transmitters and transceivers, the laser diode driver ICs generate large amounts of heat. If adequate measures to dissipate this heat are not taken, the heat can detrimentally affect the performance of the laser diode ICs, which are typically placed in relatively close proximity to the laser diode driver IC. Heat dissipation considerations are even more important in parallel optical communications device due to the large number of channels and associated electrical circuitry.

In addition to being effective at dissipating heat, heat sink devices should be efficient in terms of space utilization. Also, because heat sink devices are typically made of an electrically conductive material, such as copper, for example, they can affect the electromagnetic characteristics of the optical communications device. This is especially true in parallel optical communications devices due to the relatively large number of high speed signals that are carried on the electrical conductors of the flex circuit and the circuit board. If the heat sink device is too close to these high speed signal pathways, it can create capacitances that degrade signal quality. Therefore, heat sink devices should also be designed in ways that do not degrade signal quality.

There is an ever-increasing need to decrease the size of parallel optical communications devices and to increase the number of channels of parallel optical communications devices. In order to meet these needs, the layout of a parallel optical communications device should be efficient in terms of space utilization, have highly effective heat dissipation characteristics, and protect signal integrity. Accordingly, a need exists for a parallel optical communications device that achieves these goals.

SUMMARY OF THE INVENTION

The invention provides a parallel optical communications device having a mounting core and a method for mounting components in a parallel optical communications device. The parallel optical communications device comprises a circuit board, a mounting core, at least a first core IC, a plurality of active optical devices, and an optics subsystem. The circuit board has an upper surface and a lower surface and one or more electrical conductors therein. At least one IC is mounted on the upper surface of the circuit board at a first mounting location of the circuit board. The mounting core comprises a substantially rigid thermally conductive material to enable the mounting core to function as both a heat dissipation structure and as a mounting structure. A lower surface of the mounting core is attached at one or more locations thereof to one or more locations on the upper surface of the circuit board. The first core IC is mounted on the upper surface of the mounting core at a first mounting location of the mounting core. The plurality of active optical devices are mounted on the upper surface of the mounting core at a second mounting location of the mounting core. The core IC is electrically connected to at least a plurality of the active optical devices to allow the core IC to control operations of the active optical devices to which the core IC is connected. At least some heat generated by one or both of the core IC and the active optical devices passes into the mounting core. At least some of the heat that passes into the mounting core is dissipated by the mounting core. The optics subsystem comprises a plurality of optical elements for directing light between respective ones of the active optical devices and respective ends of respective optical waveguides.

The method comprises providing a circuit board, providing a mounting core, mounting at least a first core IC on the upper surface of the mounting core at a first mounting location of the mounting core, mounting a plurality of active optical devices mounted on the upper surface of the mounting core in a second mounting location of the mounting core, and mechanically coupling an optics subsystem to one or more components of the optical communications device. The circuit board has at least one IC mounted on the upper surface of the circuit board at a first mounting location of the circuit board. The substantially rigid thermally conductive material of the mounting core enables the mounting core to function as both a heat dissipation structure and as a mounting structure. The lower surface of the mounting core is attached at one or more locations thereof to one or more locations on the upper surface of the circuit board. The first core IC mounted on the upper surface of the mounting core is electrically connected to at least a plurality of the active optical devices to allow the first core IC to control operations of those active optical devices. At least some heat generated by one or both of the core IC and the active optical devices passes into the mounting core, and at least some of the heat that passes into the mounting core is dissipated by the mounting core. The optics subsystem comprises a plurality of optical elements for directing light between respective ones of the active optical devices and respective ends of respective optical waveguides.

These and other features and advantages of the invention will become apparent from the following description, drawings and claims.

DETAILED DESCRIPTION OF AN ILLUSTRATIVE EMBODIMENT

In accordance with the invention, a parallel optical communications device is provided that has a mounting core that functions as a mounting system for mounting core components of the parallel optical communications device. In addition, the mounting core functions as a heat dissipation system for the core components of the parallel optical communications device, and also protects the core components and other elements of the communications device from dust and damage that can be caused by handling and other factors. In addition to performing the aforementioned functions, the mounting core is configured to enable the parallel optical communications device to be made extremely small in size while also protecting signal integrity. Other features and advantages of the mounting core are described below with reference to the figures.

Figure 1:
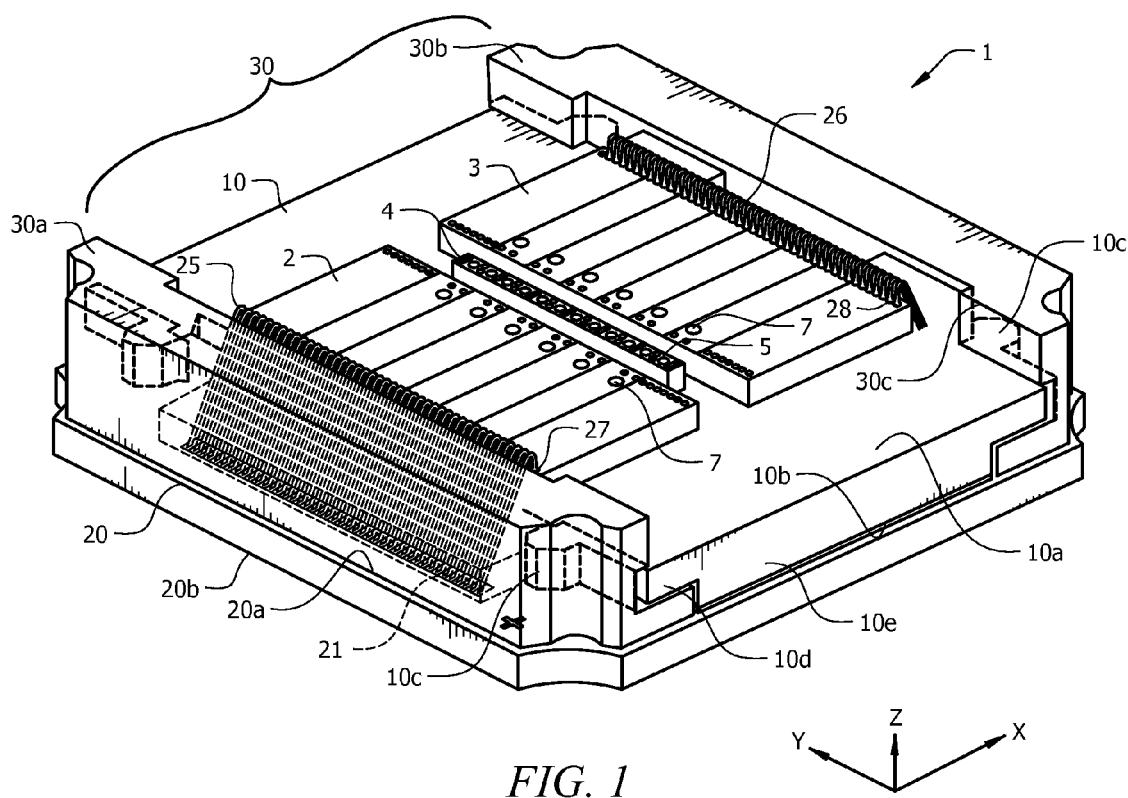
FIG. 1 illustrates a perspective view of the lower portion of a parallel optical communications device in accordance with an illustrative embodiment.

FIG. 1 illustrates a perspective view of the lower portion of a parallel optical communications device 1 in accordance with an illustrative embodiment. In accordance with this embodiment, the parallel optical communications device 1 is a parallel optical transmitter. However, it should be noted that the parallel optical communications device of the invention may be a parallel optical transmitter, a parallel optical receiver or a parallel optical transceiver. In the interest of brevity, illustrative embodiments of the invention will be described with reference to a parallel optical transmitter. Those of ordinary skill in the art will understand the manner in which the principles and concepts described herein in relation to the parallel optical transmitter 1 can be applied to parallel optical receivers and parallel optical transceivers.

The parallel optical transmitter 1 includes a mounting core 10 that serves as a mounting system for mounting at least the core components of the transmitter 1. In accordance with this embodiment, the core components of the parallel optical transmitter 1 include a first laser diode driver IC 2, a second laser diode driver IC 3, and a vertical cavity surface emitting laser (VCSEL) IC 4. The laser diode driver ICs 2 and 3 and the VCSEL IC 4 are mounted on an upper surface 10A of the mounting core 10. The laser diode driver ICs 2 and 3 are electrically connected to the VCSEL IC 4 by electrical conductors (not shown), such as bond wires, to enable electrical control signals and other electrical signals to be sent from the laser diode driver ICs 2 and 3 to the VCSEL IC 4. The VCSEL IC 4 has a plurality of VCSEL laser diodes 5 that produce a plurality of respective optical data signals based on the electrical control signals and respective electrical data signals provided to the VCSEL IC 4 by the laser diode driver ICs 2 and 3. The electrical control signals control the bias and modulation currents of the VCSEL laser diodes 5.

In the illustrative embodiment shown in FIG. 1, the laser diode driver ICs 2 and 3 and the VCSEL IC 4 are arranged in a balanced laser driver layout on the upper surface 10A of the mounting core 10. In the balanced laser driver layout, half of the laser diodes 5 of the VCSEL IC 4 are driven by laser diode driver IC 2 and the other half of the laser diodes 5 of the VCSEL IC 4 are driven by laser diode driver IC 3. Because each of the laser diode driver ICs 2 and 3 drives a subset of the total number of laser diodes 5, the pitch (i.e., distance) between the high-speed signal pathways within the laser diode driver ICs can be increased. Increasing the pitch between the high-speed signal pathways provides several advantages. One advantage of the increased pitch is that it reduces the potential for electrical cross-talk and inductive coupling between adjacent wire bonds that connect the output driver pads on the driver IC to the respective input pads on the laser diode IC. Reducing the potential for electrical cross-talk and inductive coupling between these wire bonds helps ensure high signal integrity. Another advantage of the increased pitch is that the reduced potential for electrical cross-talk and inductive coupling makes it possible to mount the driver IC in closer proximity to the laser diode IC than would otherwise be possible. Mounting the driver IC in closer proximity to the laser diode IC allows the lengths of the wire bonds between the driver IC and the laser diode IC to be reduced, which further reduces the potential for electrical cross-talk and inductive coupling between adjacent wire bonds.

While the balanced laser driver layout shown in FIG. 1 provides several advantages, it should be noted that it is not necessary to use the balanced laser driver layout shown in FIG. 1. The ICs and any other components that are mounted on the upper surface 10A of the mounting core 10 may be arranged in any desired layout. For example, the laser diode driver IC 2 could be used to drive all of the laser diodes 5 of the VCSEL IC 4, in which case the laser diode driver IC 3 could be eliminated. Also, the invention is not limited with respect to the types of laser diodes that are used. Laser diodes other than VCELs may be used for this purpose. The invention also is not limited with respect to the types or quantity of components that are mounted on the mounting core 10.

In the embodiment shown in FIG. 1, monitor photodiodes 7 are integrated into the laser diode driver ICs 2 and 3. These monitor photodiodes 7 monitor the optical output levels of respective ones of the laser diodes 5 and produce corresponding electrical signals that are fed back to control logic (not shown), which uses the feedback to adjust the electrical control signals that are delivered by the laser diode driver ICs 2 and 3 to the VCSEL IC 4. These control signals cause the bias and/or modulation currents of the laser diodes 5 to be adjusted such that the average optical output power levels of the laser diodes 5 are maintained at substantially constant predetermined levels. The increased pitch between the high-speed signal paths provided by the balanced driver layout shown in FIG. 1 enables the monitor photodiodes 7 to be integrated into the laser diode driver ICs 2 and 3. Integrating the monitor photodiodes 7 into the laser diode driver ICs 2 and 3 eliminates the need to provide a separate monitor photodiode IC in the transmitter 1 for monitoring the optical output power levels of the laser diodes 5. Eliminating the need for a separate monitor photodiode IC results in a more efficient utilization of space in the optical transmitter 1, thereby enabling the transmitter 1 to be reduced in size relative to the aforementioned known parallel optical transmitters. In addition, eliminating the need for a separate monitor photodiode IC also results in fewer wire bonds and pin connections, which reduces circuit complexity, power consumption, electrical cross-talk, and inductive coupling. However, the monitor photodiodes 7 are optional and are not required by the parallel optical communications device of the invention.

The mounting core 10 has a lower surface 10B that is attached to an upper surface 20A of a substrate 20 of the parallel optical transmitter 1. The substrate 20 is a circuit board of some type, such as a land grid array (LGA), for example. In accordance with the illustrative embodiment shown in FIG. 1, the circuit board 20 is a LGA having electrical conductors (not shown) and electrical vias (not shown) extending through the LGA substrate, and electrical contacts 21 on the upper surface 20A thereof. The electrical contacts 21 on the upper surface 20A of the circuit board 20 are electrically coupled via electrically conductive bond wires 25 and 26 to electrical contact pads 27 and 28, respectively, on the laser diode driver ICs 2 and 3, respectively. The lower surface 10B of the mounting core 10 preferably is secured to the upper surface 20A of the circuit board 20 with an adhesive material, such as an epoxy, an adhesive tape or solder, for example. The lower surface 20B of the circuit board 20 has an array of electrically conductive contact pads thereon that electrically couple to an array (not shown) of electrically conductive contact pads located on a motherboard (not shown). The motherboard (not shown) typically has a controller IC (not shown) mounted on it that communicates with the laser diode driver ICs 2 and 3 of the parallel optical transmitter 1.

As will be described below in more detail, the mounting core 10 preferably has tabs 10C that protrude outwardly at the corners of the core 10. The tabs 10C are shaped and sized to mate with indentations 30C formed in a bond wire protector 30 comprising first and second bond wire protector devices 30A and 30B. This mating configuration enables the bond wire protector devices 30A and 30B to be passively aligned with and mechanically coupled to the mounting core 10. As will be described below in more detail, when the bond wire protector devices 30A and 30B are in engagement with the mounting core 10, a gap exists between the bond wire protector devices 30A and 30B and the side edges of the mounting core 10 within which the bond wires 25 and 26 extend between the contacts 21 on the circuit board 20 and the contact pads 27 and 28 on the laser diode driver ICs 2 and 3. This gap ensures that the bond wire protector devices 30A and 30B do not come into contact with the bond wires 25 and 26 and cause them to be damaged. The bond wire protector devices 30A and 30B protect the bond wires 25 and 26 from external forces that can potentially damage the bond wires 25 and 26, such as mechanical handling forces that occur during the manufacturing and assembling of the parallel optical transmitter 1.

In accordance with an exemplary or illustrative embodiment, the mounting core has an upper portion 10D that includes the upper surface 10A of the core 10, and a lower portion 10E that includes the lower surface 10B of the core 10. With reference to the X, Y, Z Cartesian coordinate reference shown below FIG. 1, the length of the upper portion 10D in the X direction is greater than the length of the lower portion 10E in the X direction. The mounting core 10 is typically made of a material that has a high thermal conductivity, such as copper plated with nickel or gold, for example, to enable the core 10 to function effectively as a heat dissipation structure. Heat generated by the ICs 2, 3 and 4 passes down into the core 10 and is dissipated by the core 10. Making the upper portion 10D of the core 10 large in the X dimension increases the amount of surface area on the upper surface 10A of the core 10 that is available for sinking heat.

Because the material that is used to make the core 10 is also electrically conductive, if the core 10 is too close to the signal pathways (not shown) in the circuit board 20, the core 10 can couple capacitance into the circuit board 20 that increases the capacitance of the signal pathways in the circuit board 20. This increased coupling capacitance can degrade signal quality. This is especially true for the high speed signal pathways (not shown), such as those that carry the electrical data signals that are used to modulate the laser diodes 5 of the VCSEL IC 4. Making the lower portion 10E of the core smaller than the upper portion 10D in the X dimension ensures that the lower surface 10B of the core 10 has a relatively small surface area compared to the upper surface 10A of the core 10, thereby minimizing the coupling capacitance contributed by the core 10 to the circuit board 20. In order to further reduce the effect of coupling capacitance, the high speed signal pathways (not shown) in the circuit board 20 are routed such that they are never contained in the portion of the upper surface 20A of the circuit board 20 that is directly below the lower portion 10E of the core 10. The high speed signal pathways are either routed around this region where the lower surface 10B of the core 10 attaches to the upper surface 20A of the circuit board 20, or are routed in lower layers of the circuit board 20 that are farther away from the lower surface 10B of the core 10 in this region.

Figure 2:
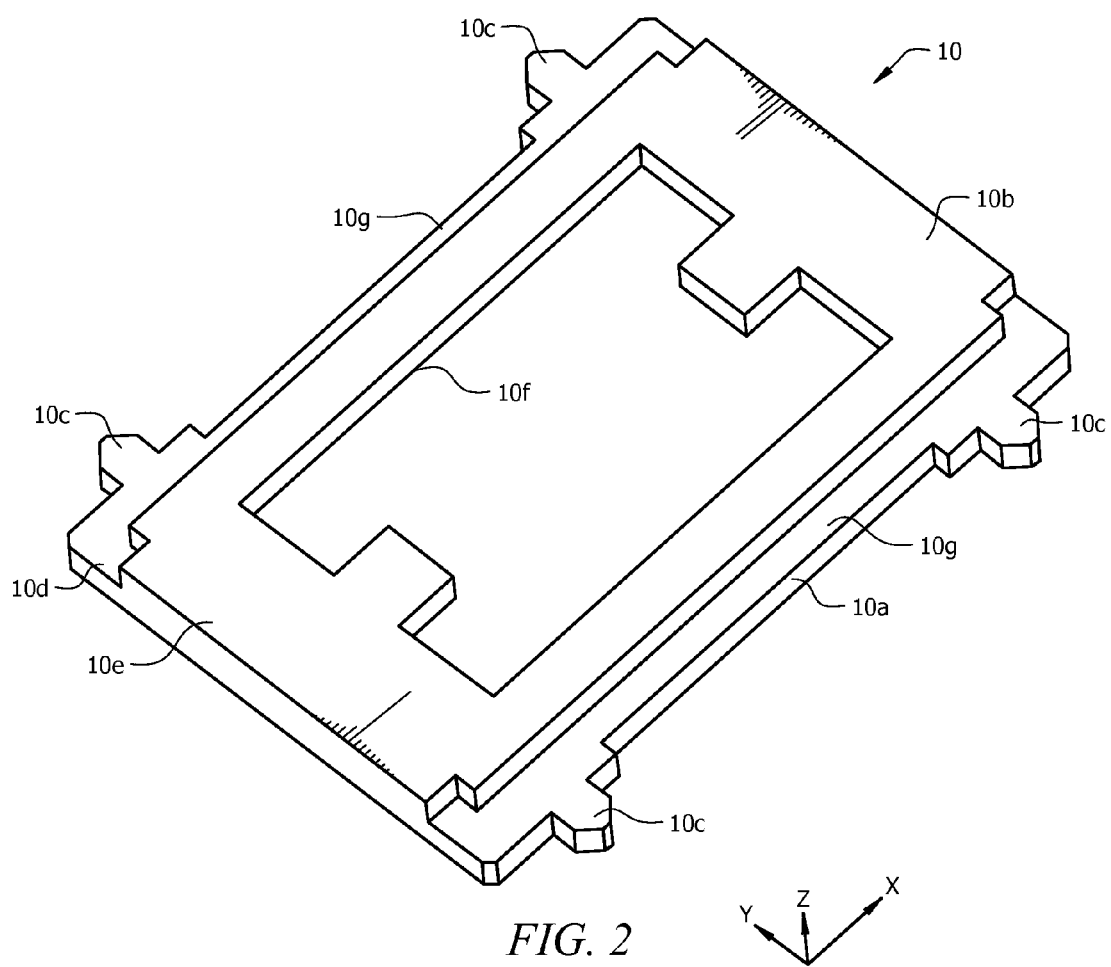
FIG. 2 illustrates a perspective bottom view of the mounting core of the parallel optical communications device shown in FIG. 1.

FIG. 2 illustrates a perspective bottom view of the mounting core 10 shown in FIG. 1. In accordance with the illustrative embodiment, the core is generally rectangular in shape in the X-by-Y dimensions, except that the tabs 10C extend from the corners of the core 10. The tabs 10C may be chamfered on their ends to facilitate their passive alignment with the indentations 30C (FIG. 1) formed in the bond wire protector devices 30A and 30B (FIG. 1). In FIG. 2, it can be seen that the core 10 has a cutaway area 10F formed in its lower surface 10B in the lower portion 10E of the core 10. The cutaway area 10F is an area where a portion of the material that is used to form the core 10 has been removed. The cutaway area 10F provides room for components (not shown) that may be mounted on the upper surface 20A of the circuit board 20 (FIG. 1). Providing the cutaway area 10F in the core 10 enables the height in the Z dimension of the parallel optical transmitter 1 to be kept relatively small, thereby improving overall compactness. The core 10 also has steps 10G on the sides in the Y dimension that provide room for the bond wires and prevent the bond wire protector devices 30A and 30B from damaging the bond wires 25 and 26 when the devices 30A and 30B are mechanically coupled with the core 10.

Figure 3:
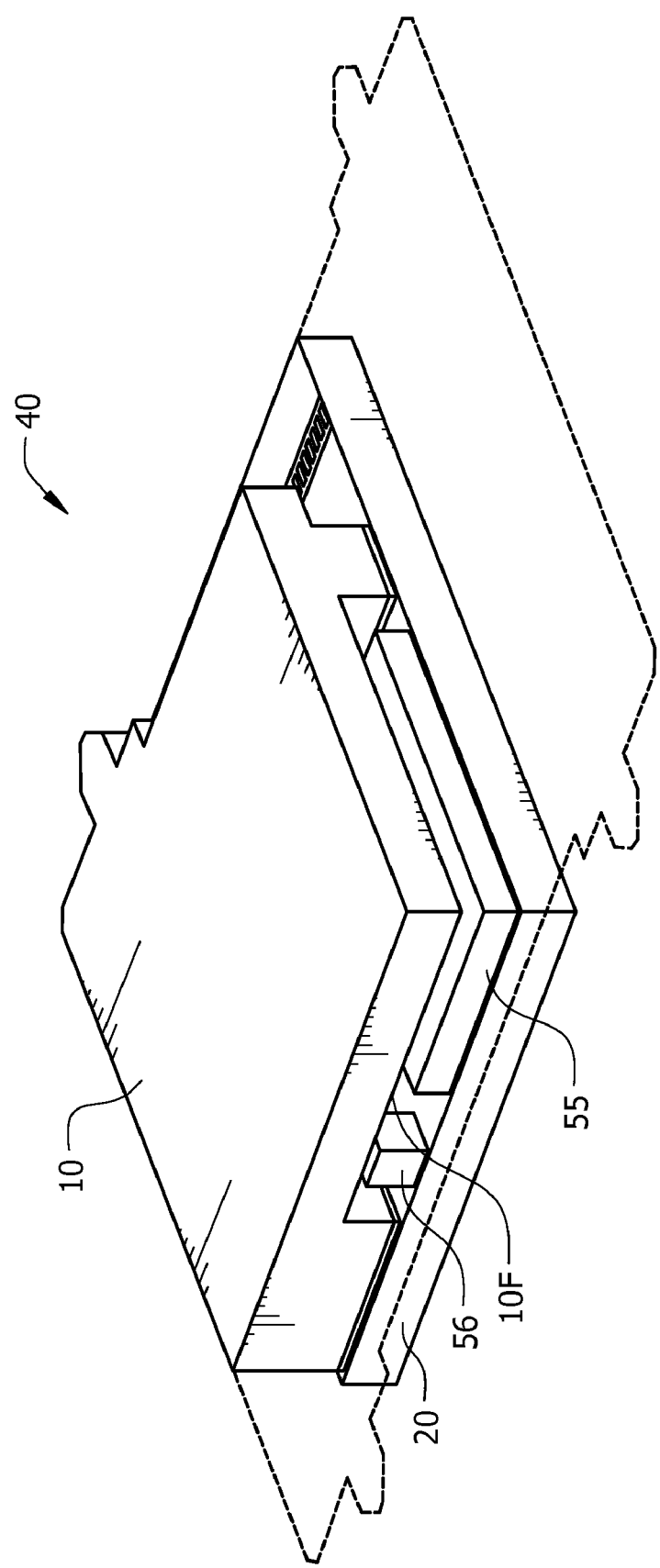
FIG. 3 illustrates a perspective view of a portion of the parallel optical communications device shown in FIG. 1 with a cross section removed to show components that are mounted on the circuit board within the space provided by the cutaway area on the mounting core.

FIG. 3 illustrates a perspective view of a portion 40 of the parallel optical transmitter 1 with a cross section removed to show components 55 and 56 that are mounted on the circuit board 20 within the space provided by the cutaway area 10F. The component 55 may be, for example, a controller IC that communicates with the laser diode driver ICs 2 and 3 to control their operations. The component 56 may be some other electrical component, such as, for example, a resistor, capacitor, inductor, etc. The invention is not limited with respect to the types of components that are mounted on the circuit board 20 within the cutaway area 10F. The core 10 provides protection for the components 55 and 56 mounted on the circuit board 20 in the cutaway area 10F from high compression forces that may be exerted on the core 10 when a customer attaches a heat sink device (not shown) to the parallel optical transmitter 1, as well as other forces exerted during testing and manufacturing.

Figure 4:
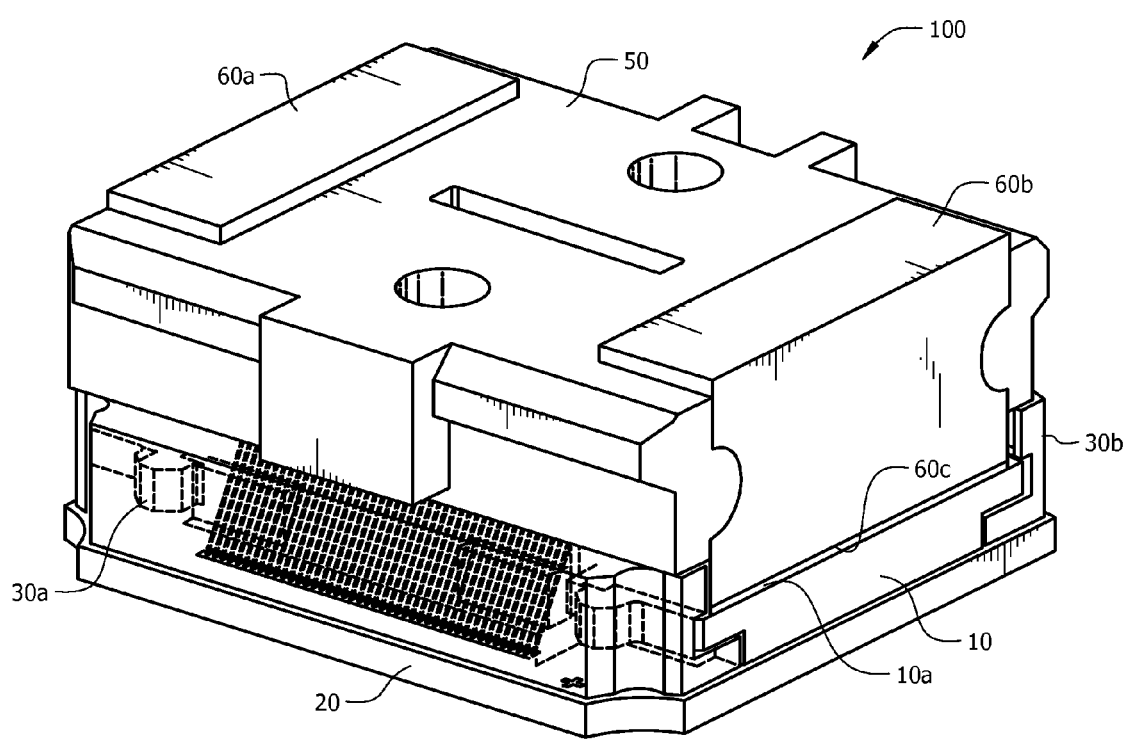
FIG. 4 illustrates a perspective view of a parallel optical transmitter module comprising the parallel optical communications device shown in FIG. 1, an optics subsystem, and two heat sink blocks.

FIG. 4 illustrates a perspective view of a parallel optical transmitter module 100 comprising the parallel optical transmitter 1 shown in FIG. 1, an optics subsystem 50, and two heat sink blocks 60A and 60B. The optics subsystem 50 is secured to the parallel optical transmitter 1 by one or more mechanical locking features (not shown) and/or by an adhesive material, such as epoxy. The optics subsystem 50 has optical elements such as lenses, for example, that couple the optical signals produced by the laser diodes 5 of the VCSEL IC 4 into the ends of respective optical fibers (not shown) attached to the optics subsystem 50. The heat sink blocks 60A and 60B have lower surfaces 60C that are fixedly attached to the upper surface 10A of the mounting core 10. Heat that is generated by the ICs 2, 3 and 4 passes into the core 10. Any of the heat that is not dissipated by the core 10 then passes from the upper surface 10A of the core 10 through the lower surfaces 60C of the heat sink blocks 60A and 60B and into the heat sink blocks 60A and 60B, which absorb the heat.

Another benefit of the mounting core 10 is that it adds support to the circuit board 20 that helps prevent the circuit board 20 from bending, twisting or bowing when forces are exerted on the module 100. For example, when the heat sink blocks 60A and 60B are secured to the upper surface 10A of the core 10, relatively high compression forces are exerted on the module 100. The core 10 absorbs these forces and prevents them from causing the circuit board 20 to bend, twist or bow.

Figure 5:
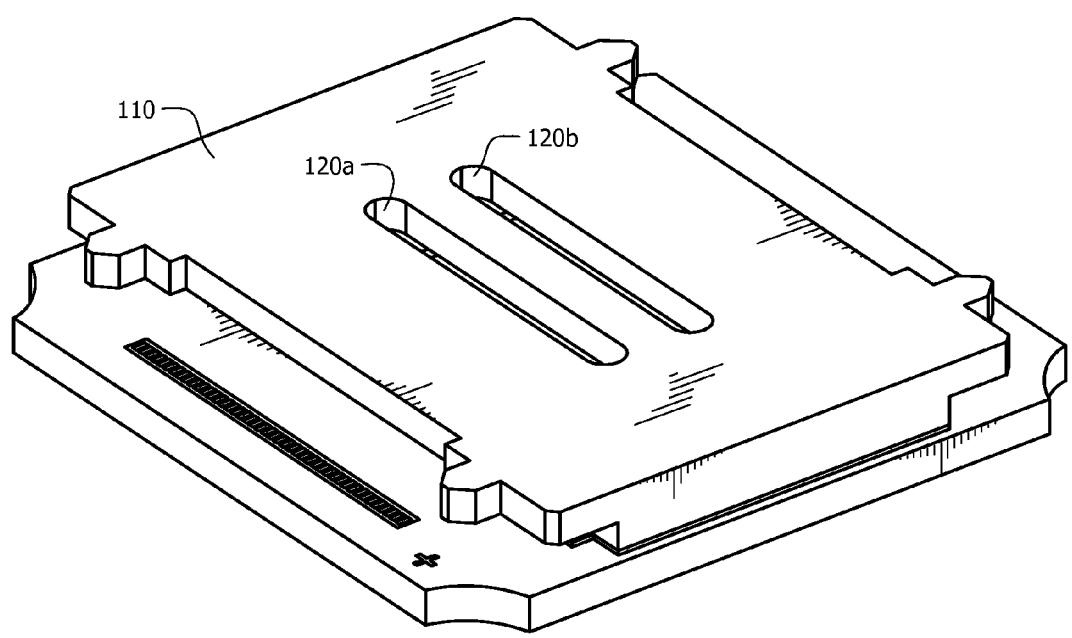
FIG. 5 illustrates the mounting core in accordance with another illustrative embodiment in which the mounting core has first and second slots formed therein.

FIG. 5 illustrates the mounting core 110 in accordance with another illustrative embodiment. The mounting core 110 is identical to the mounting core 10 shown in FIG. 2 except that the mounting core 110 shown in FIG. 5 has first and second slots 120A and 120B formed therein that provide air gaps between the locations at which the laser diode driver ICs 2 and 3 are mounted and the location at which the VCSEL IC 4 is mounted. For example, assuming that the balanced drive layout shown in FIG. 1 is used, the slot 120A is positioned between the laser diode driver IC 2 and the VCSEL IC 4 and the slot 120B is positioned between the laser diode driver IC 3 and the VCSEL IC 4. The slots 120A and 120B lessen the amount of heat generated by the laser diode driver ICs 2 and 3 that is allowed to propagate through the core 110 to the VCSEL IC 4. Lessening the amount of heat that is allowed to propagate through the core 110 from the laser diode driver ICs 2 and 3 to the VCSEL IC 4 further ensures that the operations of the VCSEL IC 4 will not be degraded due to heat generated by the laser diode driver ICs 2 and 3. In addition, because the slots 120A and 120B thermally isolate the VCSEL 4 from the driver ICs 2 and 3, the slots 120A and 120B allow the lengths of the wire bonds (not shown) that connect the driver ICs 2 and 3 to the VCSEL IC 4 to be very short, which reduces or eliminates the potential from cross-talk, inductive coupling and resistive loss caused by the wire bonds.

It should be noted that the invention has been described with respect to illustrative embodiments for the purpose of describing the principles and concepts of the invention. The invention is not limited to these embodiments. For example, while the invention has been described with reference to using a particular balanced driver layout, the invention is not limited to this particular layout. Also, while the invention has been described with reference to a parallel optical transmitter in which all channels are transmit channels, the parallel optical communications device of the invention instead may include transmit and receive channels or only receive channels. As will be understood by those skilled in the art in view of the description being provided herein, many modifications may be made to the embodiments described herein while still providing a parallel optical communications device that achieves the goals of the invention, and all such modifications are within the scope of the invention.

What is claimed is:

1. A parallel optical communications device comprising:

a circuit board, the circuit board having an upper surface and a lower surface and one or more electrical conductors therein, the circuit board having at least one integrated circuit (IC) mounted on the upper surface of the circuit board at a first mounting location of the circuit board;

a mounting core comprising a substantially rigid thermally conductive material to enable the mounting core to function as both a heat dissipation structure and as a mounting structure, the mounting core having an upper surface and a lower surface, the lower surface of the mounting core being attached at one or more locations thereof to one or more locations on the upper surface of the circuit board, the lower surface of the mounting core having a cutaway area formed therein where a portion of the mounting core beneath the upper surface of the mounting core is absent so that the at least one IC mounted on the upper surface of the circuit board is disposed within the cutaway area beneath the upper surface of the mounting core;

at least a first core IC mounted on the upper surface of the mounting core at a first mounting location of the mounting core;

a plurality of active optical devices mounted on the upper surface of the mounting core at a second mounting location of the mounting core, the core IC mounted on the upper surface of the mounting core being electrically connected to at least a plurality of the active optical devices to allow the core IC to control operations of the active optical devices to which the core IC is connected, and wherein at least some heat generated by one or both of the core IC and the active optical devices passes into the mounting core, and wherein at least some of the heat that passes into the mounting core is dissipated by the mounting core; and an optics subsystem comprising a plurality of optical elements for directing light between respective ones of the active optical devices and respective ends of respective optical waveguides.

2. The parallel optical communications device of claim 1, wherein core IC is a laser diode driver IC, and wherein the active optical devices are laser diodes, the parallel optical communications device being a parallel optical transmitter.

3. The parallel optical communications device of claim 1, wherein core IC is a receiver IC, and wherein the active optical devices are photodiodes, the parallel optical communications device being a parallel optical receiver.

4. The parallel optical communications device of claim 1, further comprising:

at least a second core IC mounted on the upper surface of the mounting core at a third mounting location of the mounting core, and wherein the first core IC is a laser diode driver IC and the second core IC is a receiver IC, and wherein a first subset of the active optical devices are laser diodes and a second subset of the active optical devices are photodiodes, the parallel optical communications device being a parallel optical transceiver.

5. The parallel optical communications device of claim 1, further comprising:

at least a second core IC mounted on the upper surface of the mounting core at a third mounting location of the mounting core, and wherein the second mounting location of the mounting core where the plurality of active optical devices are mounted is in between and equidistant from the first and third mounting locations of the mounting core, and wherein the first and second core ICs are first and second laser diode driver ICs, respectively, and wherein a first subset of the active optical devices are laser diodes that are controlled by the first core IC and a second subset of the active optical devices are laser diodes that are controlled by the second core IC.

6. The parallel optical communications device of claim 1, wherein the mounting core has a first core portion and a second core portion, the first core portion having a side corresponding to the upper surface of the mounting core, the second core portion having a side corresponding to the lower surface of the mounting core, and wherein the first core portion has a width corresponding to a width of the upper surface of the mounting core in an X dimension of a Cartesian coordinate reference frame, and wherein the second core portion has a width corresponding to a width of the lower surface of the mounting core in the X dimension of the Cartesian coordinate reference frame, and wherein the width of the first core portion is greater than the width of the second core portion.

7. The parallel optical communications device of claim 6, wherein the cutaway area is formed in the second core portion, and wherein the cutaway area surrounds at least the IC mounted on the upper surface of the circuit board at the first mounting location of the circuit board and protects the IC mounted on the upper surface of the circuit board from external forces.

8. The parallel optical communications device of claim 6, wherein the electrical conductors of the circuit board include electrical conductors that carry high speed signals and electrical conductors that carry lower speed signals, and wherein the high speed electrical conductors are laid out in the circuit board such that the high speed electrical conductors either do not pass under the second core portion at all or only pass under the second core portion in one or more layers of the circuit board that are not adjacent the upper surface of the circuit board.

9. The parallel optical communications device of claim 1, further comprising:

at least a second core IC mounted on the upper surface of the mounting core at a third mounting location of the mounting core, and wherein the second mounting location of the mounting core where the plurality of active optical devices are mounted is in between and equidistant from the first and third mounting locations of the mounting core; and a bond wire protector comprising a first bond wire protector device and a second bond wire protector device, the first and second bond wire protectors device being mechanically coupled to first and second sides, respectively, of the mounting core, the first bond wire protector device protecting bond wires extending between the first core IC and the circuit board from forces that are exerted on the parallel optical communications device, the second bond wire protector device protecting bond wires extending between the second core IC and the circuit board from forces that are exerted on the parallel optical communications device.

10. The parallel optical communications device of claim 9, wherein the mounting core and the bond wire protector have keying features thereon that mate to mechanically couple the bond wire protector to the mounting core.

11. A method for mounting components in a parallel optical communications device, the method comprising:

providing a circuit board, the circuit board having an upper surface and a lower surface and one or more electrical conductors therein, the circuit board having at least one integrated circuit (IC) mounted on the upper surface of the circuit board at a first mounting location of the circuit board;

providing a mounting core comprising a substantially rigid thermally conductive material to enable the mounting core to function as both a heat dissipation structure and as a mounting structure, the mounting core having an upper surface and a lower surface, the lower surface of the mounting core being attached at one or more locations thereof to one or more locations on the upper surface of the circuit board, the lower surface of the mounting core having a cutaway area formed therein where a portion of the mounting core beneath the upper surface of the mounting core is absent so that the at least one IC mounted on the upper surface of the circuit board is disposed within the cutaway area beneath the upper surface of the mounting core;

mounting at least a first core IC on the upper surface of the mounting core at a first mounting location of the mounting core;

mounting a plurality of active optical devices mounted on the upper surface of the mounting core at a second mounting location of the mounting core, the core IC mounted on the upper surface of the mounting core being electrically connected to at least a plurality of the active optical devices to allow the core IC to control operations of the active optical devices to which the core IC is connected, and wherein at least some heat generated by one or both of the core IC and the active optical devices passes into the mounting core, and wherein at least some of the heat that passes into the mounting core is dissipated by the mounting core; and mechanically coupling an optics subsystem to one or more components of the optical communications device, the optics subsystem comprising a plurality of optical elements for directing light between respective ones of the active optical devices and respective ends of respective optical waveguides.

12. The method of claim 11, wherein core IC is a laser diode driver IC, and wherein the active optical devices are laser diodes, the parallel optical communications device being a parallel optical transmitter.

13. The method of claim 11, wherein core IC is a receiver IC, and wherein the active optical devices are photodiodes, the parallel optical communications device being a parallel optical receiver.

14. The method of claim 11, further comprising:

mounting at least a second core IC on the upper surface of the mounting core at a third mounting location of the mounting core, and wherein the first core IC is a laser diode driver IC and the second core IC is a receiver IC, and wherein a first subset of the active optical devices are laser diodes and a second subset of the active optical devices are photodiodes, the parallel optical communications device being a parallel optical transceiver.

15. The method of claim 11, further comprising:

mounting at least a second core IC on the upper surface of the mounting core at a third mounting location of the mounting core, and wherein the second mounting location of the mounting core where the plurality of active optical devices are mounted is in between and equidistant from the first and third mounting locations of the mounting core, and wherein the first and second core ICs are first and second laser diode driver ICs, respectively, and wherein a first subset of the active optical devices are laser diodes that are controlled by the first core IC and a second subset of the active optical devices are laser diodes that are controlled by the second core IC.

16. The method of claim 11, wherein the mounting core has a first core portion and a second core portion, the first core portion having a side corresponding to the upper surface of the mounting core, the second core portion having a side corresponding to the lower surface of the mounting core, and wherein the first core portion has a width corresponding to a width of the upper surface of the mounting core in an X dimension of a Cartesian coordinate reference frame, and wherein the second core portion has a width corresponding to a width of the lower surface of the mounting core in the X dimension of the Cartesian coordinate reference frame, and wherein the width of the first core portion is greater than the width of the second core portion.

17. The method of claim 16, wherein the cutaway area is formed in the second core portion, and wherein the cutaway area surrounds at least the IC mounted on the upper surface of the circuit board at the first mounting location of the circuit board and protects the IC mounted on the upper surface of the circuit board from external forces.

18. The method of claim 16, wherein the electrical conductors of the circuit board include electrical conductors that carry high speed signals and electrical conductors that carry lower speed signals, and wherein the high speed electrical conductors are laid out in the circuit board such that the high speed electrical conductors either do not pass under the second core portion at all or only pass under the second core portion in one or more layers of the circuit board that are not adjacent the upper surface of the circuit board.

19. The method of claim 11, further comprising:

mounting at least a second core IC mounted on the upper surface of the mounting core at a third mounting location of the mounting core, and wherein the second mounting location of the mounting core where the plurality of active optical devices are mounted is in between and equidistant from the first and third mounting locations of the mounting core; and mechanically coupling a bond wire protector comprising a first bond wire protector device and a second bond wire protector device to first and second sides, respectively, of the mounting core, the first bond wire protector device protecting bond wires extending between the first core IC and the circuit board from forces that are exerted on the parallel optical communications device, the second bond wire protector device protecting bond wires extending between the second core IC and the circuit board from forces that are exerted on the parallel optical communications device.

20. The method of claim 19, wherein the mounting core and the bond wire protector have keying features thereon that mate to mechanically couple the bond wire protector to the mounting core.

* * * * *